(12) United States Patent
Mueller et al.

(10) Patent No.: US 9,738,531 B2
(45) Date of Patent: Aug. 22, 2017

(54) PROCESS FOR PRODUCING POLYCRYSTALLINE SILICON

(71) Applicant: Wacker Chemie AG, Munich (DE)

(72) Inventors: Barbara Mueller, Burgkirchen (DE); Walter Haeckl, Kirchweidach (DE); Wolfgang Stoiber, Eggenfelden (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/023,567

(22) PCT Filed: Aug. 27, 2014

(86) PCT No.: PCT/EP2014/068119
§ 371 (c)(1),
(2) Date: Mar. 21, 2016

(87) PCT Pub. No.: WO2015/039841
PCT Pub. Date: Mar. 26, 2015

(65) Prior Publication Data
US 2016/0214864 A1    Jul. 28, 2016

(30) Foreign Application Priority Data
Sep. 23, 2013  (DE) ......................... 10 2013 219 070

(51) Int. Cl.
*C01B 33/035*  (2006.01)
(52) U.S. Cl.
CPC ................... *C01B 33/035* (2013.01)

(58) Field of Classification Search
None
See application file for complete search history.

(56) References Cited

U.S. PATENT DOCUMENTS

| | | | |
|---|---|---|---|
| 5,895,594 A * | 4/1999 | Fuchs | C01B 33/035 118/50.1 |
| 2010/0043972 A1 | 2/2010 | Baldi et al. | |
| 2011/0250366 A1 | 10/2011 | Pazzaglia et al. | |
| 2012/0175613 A1* | 7/2012 | Netsu | C01B 33/037 257/49 |
| 2012/0237678 A1 | 9/2012 | Bovo et al. | |
| 2014/0004030 A1 | 1/2014 | Fabry et al. | |
| 2015/0003952 A1 | 1/2015 | Kurosawa et al. | |

FOREIGN PATENT DOCUMENTS

| | | |
|---|---|---|
| CN | 201313954 Y | 9/2009 |
| CN | 101624724 A | 1/2010 |
| DE | 102009027830 B3 | 1/2011 |
| EP | 2 157 051 A2 | 2/2010 |
| EP | 2 607 309 A1 | 6/2013 |
| JP | 63296840 A | 12/1988 |
| JP | 2002210355 A | 7/2002 |
| WO | 2013/114858 A1 | 8/2013 |

* cited by examiner

*Primary Examiner* — Joseph Miller, Jr.
(74) *Attorney, Agent, or Firm* — Brooks Kushman P.C.

(57) ABSTRACT

Installation of a shield around a Siemens reactor prior to harvesting polysilicon rods produced therein allows the upper, bell jar-like shell to be removed for cleaning, while protecting the polysilicon rods from contamination and increasing safety of nearby personnel. The polysilicon rods are harvested while the shield is present.

13 Claims, 3 Drawing Sheets

PROCESS FOR PRODUCING POLYCRYSTALLINE SILICON

CROSS REFERENCE TO RELATED APPLICATIONS

This application is the U.S. National Phase of PCT Appln. No. PCT/EP2014/068119 filed Aug. 27, 2014, which claims priority to German Application No. 10 2013 219 070.0 filed Sep. 23, 2013, the disclosures of which are incorporated in their entirety by reference herein.

BACKGROUND OF THE INVENTION

1. Field of the Invention

The invention relates to a process for producing polycrystalline silicon.

2. Description of the Related Art

High-purity polycrystalline silicon (polysilicon) serves as a starting material for production of monocrystalline silicon for semiconductors by the Czochralski (CZ) or zone-melting (FZ) processes, and for production of mono- or multicrystalline silicon by various pulling and casting processes for production of solar cells for photovoltaics.

Polysilicon is typically produced by means of the Siemens process. This involves introducing a reaction gas comprising one or more silicon-containing components and optionally hydrogen into a reactor comprising support bodies heated by direct passage of current, silicon being deposited in solid form on the support bodies. Silicon-containing components used are preferably silane ($SiH_4$), monochlorosilane ($SiH_3Cl$), dichlorosilane ($SiH_2Cl_2$), trichlorosilane ($SiHCl_3$), tetrachlorosilane ($SiCl_4$) or mixtures of the substances mentioned.

The Siemens process is typically conducted in a deposition reactor (also called "Siemens reactor"). In the most commonly used embodiment, the reactor comprises a metallic base plate and a coolable bell jar placed onto the base plate so as to form a reaction space within the bell jar. The base plate is provided with one or more gas inlet orifices and one or more offgas orifices for the departing reaction gases, and with holders which help to hold the support bodies in the reaction space and supply them with electrical current. Each support body usually consists of two thin upright filament rods and a horizontal bridge which connects the generally adjacent rods at their free ends. The filament rods are inserted vertically into electrodes present at the reactor base, through which they are connected to the power supply.

Deposition of polysilicon is accomplished by opening a shutoff valve for the reaction gas flowing into the reactor, a mixture of hydrogen and one of the aforementioned silicon-containing components, and a shutoff valve for the offgas flowing out of the reactor. The reaction gas flows through the feed orifice in the base plate into the closed deposition reactor. The silicon is deposited therein on the thin rods heated by direct passage of current. The hot offgas formed in the reactor leaves the reactor through an orifice in the base plate and can then be subjected to a processing operation, for example a condensation, or be sent to a scrubber.

High-purity polysilicon is deposited on the heated filament rods and the horizontal bridge, as a result of which the diameter thereof increases with time. Once the desired diameter has been attained, the process is stopped. The polycrystalline silicon rod pairs formed are then typically cooled to room temperature.

U-shaped polycrystalline silicon rods are obtained, which may be several meters in height and may weigh several thousands of kilograms.

After cooling to room temperature, the silicon rods can be removed from the reactor. Since the Siemens process is conducted batchwise, the reactors are shut down for this purpose, i.e. the deposition time is interrupted. At this time, the shutoff valves for reaction gas are closed and the power supply is interrupted. The deposited polycrystalline silicon can be removed from the opened reactors. To open the reactors, an upper reactor section is removed, typically raised upward.

From an economic point of view, it is advantageous to make the disassembly and setup times as short as possible, in order to keep the time before the subsequent deposition batch as short as possible.

It is necessary to deinstall the polycrystalline rod pairs from the reactor in one piece (two rods and one bridge). Full harvesters which can remove all rod pairs at the same time are also known, as will be explained hereinafter.

In the event of imprecise removal, one or more rods or rod pairs may fall over and break up in the process or on contact, for example, with the shop floor, with the base plate of the reactor, or with other rods or rod pairs. If several rods are present in the reactor, there is a very high risk that all the rods in this batch will then fracture and be unusable for further processing because of the fracturing and possible contaminations.

After rod deinstallation, it is customary to clean the bell jar and base plate of the reactor and to provide the reactor with new electrodes and thin rods for the next deposition batch. After the bell jar has been closed, the process for deposition of the next batch of polysilicon is conducted again as described above.

The opening of the reactor and the rod deinstallation should be effected in such a way as to avoid surface contamination of the rods and to minimize breakage of the rods.

JP7029045B describes a disassembly rocker which approaches the side of the reactor and lifts the rod pairs out. This process requires the complete disassembly of the reactor apart from the base plate. The risk here is that the rod pairs are removed only at the electrodes by the prongs. In the course of this, tilting of the rod pair in the wrong direction cannot be ruled out. A rod pair in an uncontrolled fall can mean not just considerable endangerment of personnel by splinters but also the loss of an entire batch if this rod pair takes the rod pairs still remaining upright in the reactor down as well.

US 20120237678 A1 discloses an apparatus for deinstalling polycrystalline silicon rods, comprising a body having outer walls and having such dimensions that the rods are surrounded by the outer walls, each outer wall including a door to allow access to at least one of the rods. In a preferred embodiment, the inner walls are lined with a polymer to prevent contamination of the polycrystalline silicon rods.

US 20100043972 A1 discloses a further apparatus for deinstalling polycrystalline silicon rods, comprising a wall comprising an inner wall, an outer wall and multiple wall connectors connecting said inner wall with said outer wall, a cavity formed between said inner wall and said outer wall, an access window formed in said outer wall, a base plate, and a plurality of contacts disposed on said base plate, wherein said inner wall and said outer wall are cylindrical and concentric, said cavity is adapted to receive a plurality of silicon rods resting on said contacts, and said access window is adapted to provide access to the silicon rods. The rods can be removed via the access window.

However, the problem is that apparatuses of this kind have a high space requirement between the rod pairs. A high space requirement, however, is disadvantageous for achievement of high economic viability (enablement of high final diameters).

An additional disadvantage of the above-described apparatuses is that, in the case of rods standing askew or in the case of a partially collapsed batch, which is not a rare occurrence, it is impossible to use them.

This also applies to the method claimed in DE 10 2009 027 830 B3 for removing polycrystalline silicon rods from a reactor, which comprises running a rigid and automated guide over the opened reactor with a computer-assisted recognition method on the basis of calibration points and taking hold of the rod pairs by means of a mechanical or pneumatic clamping apparatus and then laying them down in a transport apparatus.

JP 63296840 A discloses an apparatus for deinstalling silicon rods from a deposition reactor, in which an individual rod pair is fixed with the aid of clamps and lifted out of the side of the reactor. JP 2002210355 A likewise discloses an apparatus for deinstallation of silicon rods, comprising an arm which is movable in three dimensions and has a clamp apparatus mounted at the end thereof, which can be used to lift the silicon rods out of the reactor.

A disadvantage of these two apparatuses is the fact that the rods can be removed from the completely opened reactor only from the outside inward. A selected deinstallation of a particular silicon rod, for example from an inner rod circle, which is sometimes desirable, is impossible with the apparatus described.

A further disadvantage is that this system has to be manually actuated, and the manual coordination of this multiaxial system is very difficult. As a result, no time advantage is achieved over conventional removal apparatuses. A further disadvantage is the strong flexural forces that act on this construction as the rods are being lifted out. In the deinstallation process, a certain pulling force has to be applied, which causes the arm to give when the rods are detached. This giving of the arm on deinstallation can lead to adjacent rod pairs being touched and knocked over by the deinstallation tool. However, the main disadvantage of this system is that, for deinstallation, all the rods have to be at least partly in a clear space to be grasped by the gripper arm. If one or more rods falls over, this will inevitably lead to contamination of the silicon and may even cause serious injury to personnel.

US 20120175613 A1 discloses a method for producing a polycrystalline silicon piece, consisting of a CVD process for production of a polycrystalline silicon rod by deposition of silicon on a filament wire, one end of which is attached to a first electrode and the other end of which to a second electrode, a process for removing the polycrystalline silicon rod from the reactor and a process for comminuting the silicon rod into silicon pieces, which comprises removing at least 70 mm from the electrode end of the polycrystalline silicon rod prior to the comminution process (base shortening process). In a preferred embodiment, the surface of the polycrystalline silicon rod is covered with a bag-like polyethylene component before being removed from the reactor. The removal itself can be effected by means of a crane or the like.

The procedure disclosed in the prior art and apparatuses used have disadvantages in that the reactor section always has to be lifted away in the course of deinstallation, such that the rod pairs at least temporarily stand exposed on the base plate with nothing to prevent them from falling over. This constitutes a considerable safety risk, since rods or parts of rods falling over may cause considerable injury to personnel working alongside or in the deposition plant. Should the deinstallation proceed through an additional upper flange in the reactor, there is the disadvantage that the bell jar of the corresponding deposition plant cannot be cleaned until the deinstallation of the rods is complete. In this procedure, the time required for the batch changeover (deposition-free time) is much higher than if the bell jar could be cleaned at the same time and if it were not necessary to wait for the completion of cleaning after the deinstallation.

SUMMARY OF THE INVENTION

It was an object of the present invention to provide a process for batchwise production of high-purity polycrystalline silicon with minimum batch changeover times in the individual plants, including an integrated plant system, which avoids or overcomes the disadvantages of the prior art. These and other objects are achieved by a process for producing polycrystalline silicon, comprising introducing a reaction gas comprising a silicon-containing component and hydrogen into a reactor comprising at least one support body heated by direct passage of current, on which polycrystalline silicon is deposited, such that at least one polycrystalline silicon rod is obtained, wherein, after the deposition has ended, a protective shell or a protective wall is placed around the reactor during the deinstallation of the at least one polycrystalline silicon rod.

DETAILED DESCRIPTION OF THE PREFERRED EMBODIMENTS

Figure 1:
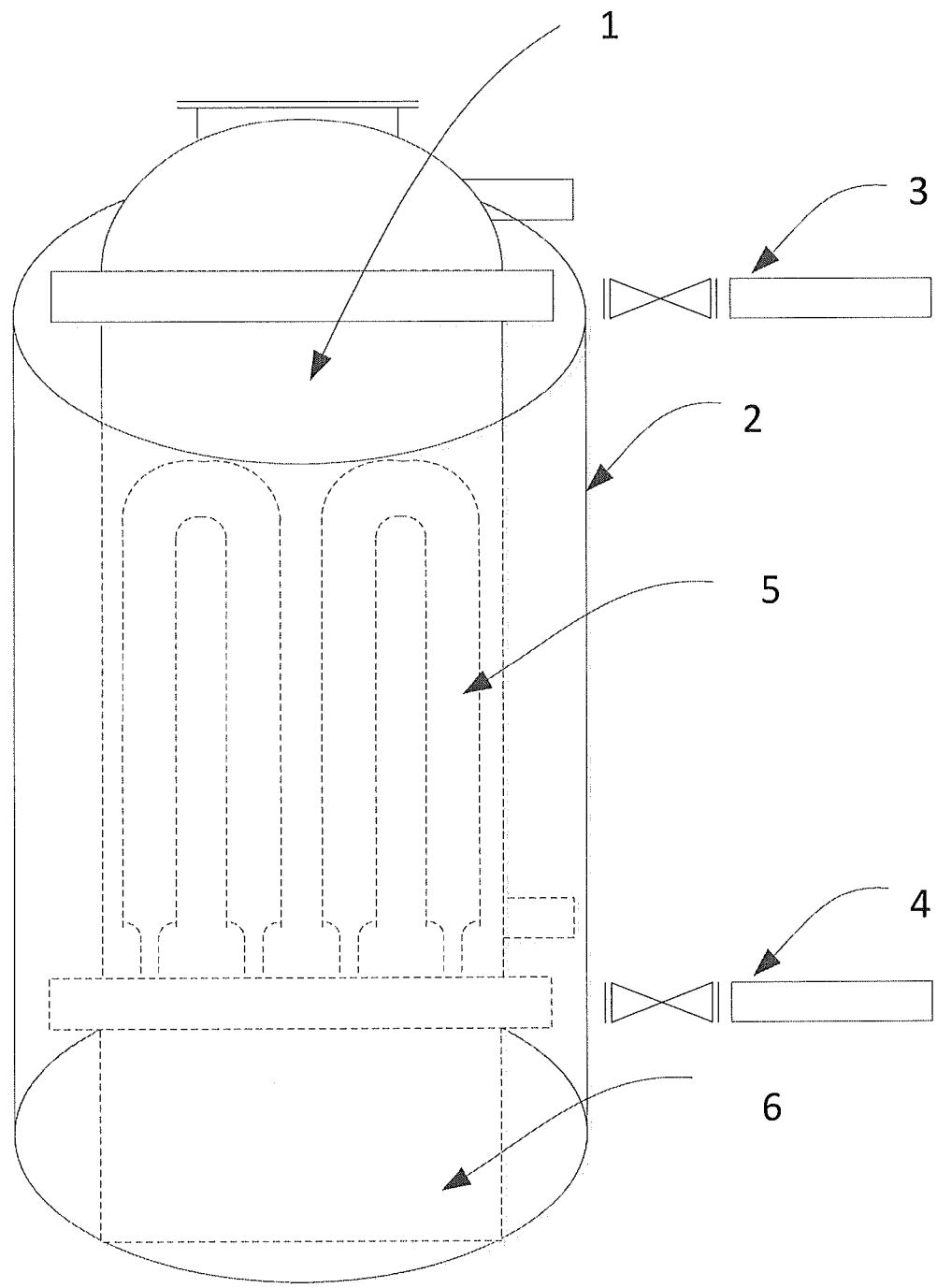
FIG. 1 shows a reactor with a protective shell.

During the deposition, the reactor is typically sealed airtight.

The support body is typically a U-shaped support body comprising two silicon rods and a horizontal bridge. During the deposition, the diameter of the support body grows. Thus, a silicon rod pair forms in the course of deposition of polycrystalline silicon on the support body.

The reaction gases, namely the silicon-containing component, which is, for example, a chlorosilane such as trichlorosilane, together with hydrogen, are introduced into the reactor via a feed line.

The deposition gives rise to an offgas comprising, inter alia silicon tetrachloride, which is removed from the reactor via a removal line.

As soon as the desired final diameter of the silicon rod pairs has been attained, the deposition is typically ended, namely by ceasing the power supply and stopping the supply of reaction gases. For this purpose, shutoff valves are typically present in the feed line for reaction gases.

Before the deinstallation of the rods commences, connections from an upper reactor section are first preferably removed from the reactor.

In a first preferred embodiment of the process, after removal of the connections from the upper reactor section, a protective shell is placed around the deposition reactor.

Subsequently, the upper reactor section is removed, especially by lifting off the upper reactor section.

In a second preferred embodiment, the placing of protective elements on the upper reactor section is envisaged. These protective elements are pulled upward as well when the upper reactor section is lifted off after it has been detached from the base structure. The protective elements are configured such that they completely surround the polycrystalline silicon rod pairs after the upper reactor section has been lifted off to a certain degree. As soon as this is the case, the protective elements are connected to the base structure, namely the base plate of the reactor, and detached from the upper reactor section. The protective elements form the protective wall envisaged in the process of the invention.

In a further preferred embodiment, a movable and foldable protective shell or protective wall is envisaged, which can be moved onto the side of the reactor and contains folding doors.

The process and the preferred embodiment thereof have the advantage that the rods are not exposed unprotected from the environment at any time in the deposition shop.

Preferably, after the deposition has ended, the reactor is opened for a particular period before or while the connections are being removed from the upper reactor section. This ventilation period preferably commences with the first opening of the reactor after the deposition of a batch of polycrystalline silicon and comprises the period after the deposition has ended until the removal of the bell jar or parts thereof with the purpose of deinstalling a polycrystalline silicon rod from the reactor. Even in the course of the rod deinstallation itself, the reactor is open, and is ventilated or purged with a purge gas for this period.

The ventilation can be effected by raising the reactor bell jar above the base plate.

It is likewise possible to open a sightglass.

Opening of flanges and input and output gas lines also serves to ventilate the reactor.

During the opening of the reactor, a medium can be fed into the reactor through an orifice and then removed again via the same or another orifice.

The medium supplied may be air or the individual constituents thereof, nitrogen, moisture, argon, helium, each individually or in combination.

After the desired rod diameter of the support body has been attained and the deposition has ended, this serves to suitably condition the reactor interior with gaseous, liquid and/or solid constituents present and the bell jar deposits present therein under defined conditions before complete opening of the deposition reactor for the purpose of rod deinstallation.

Preferably, the rod pairs are provided with a covering before they are deinstalled and as soon as they are accessible. This may be a plastic bag which surrounds the rod pairs. It is preferably a bag-like component made from high-purity PE.

The rod pairs are preferably deinstalled with an apparatus having such dimensions that it can completely surround a U-shaped rod pair, and the apparatus together with the U-shaped rod pair that it surrounds interacts with a crane, a cable winch or a grab such that the apparatus along with the U-shaped rod pair can be removed from the reactor.

The apparatus may be manufactured from a low-contamination cemented carbide or from a plastic. It may preferably consist of steel, more preferably of stainless steel such as V2A=1.4301, 1.4541 and 1.4307 or combinations of these materials, and the inner wall may be coated or lined with a low-contamination material, for example a plastic or a cemented carbide. It is possible to apply one or more layers of gold or silver to the inner surface of the apparatus. This application can be effected chemically or mechanically (for example as a composite or plating (spheroidal graphite cast iron with cemented carbide grains or platelets)).

After the rods have been deinstalled, they are preferably transported away for further processing.

The support bodies are heated by direct passage of current to a temperature at which polycrystalline silicon is deposited thereon. The rod temperature is preferably 1150 K to 1600 K. For this purpose, the support bodies are typically connected to electrodes made from high-purity electrographite, through which the power is supplied. Preferably, therefore, the graphite electrode is removed from the base of the rod after the rod pairs have been deinstalled.

Subsequently, the rod pairs are preferably comminuted to chunks of different size classes, for example by means of a jaw crusher or a roll crusher. The comminution is optionally followed by wet-chemical cleaning of the chunks. Finally, the chunks are preferably packed in plastic bags and transported to the customers.

Especially preferred embodiments of the invention are described hereinafter.

As already mentioned, in the prior art, the upper reactor section is removed, with prior removal of all the components connected to the upper reactor section. The upper reactor section is typically removed by lifting. After the upper reactor section has been removed, the exposed rod pairs can be deinstalled. However, there is the risk that the rod pairs can fall over. Moreover, the rod pairs are exposed to the environment and hence possibly to contaminating influences.

The invention describes a process by which the setup times for a CVD reactor can be distinctly reduced without losses in relation to safety aspects.

The invention is also illustrated hereinafter by FIGS. 1-3.

LIST OF REFERENCE NUMERALS USED

1 Upper reactor section (bell jar)
2 Protective shell
3 Media inlet/outlet
4 Media inlet/outlet
5 Polycrystalline silicon rods
6 Base structure/base plate
7 Protective elements
8 Movable protective wall FIG. 1 shows a first embodiment of the process, and illustrates a reactor having an upper reactor section 1, inlets and outlets 3 and 4 for media (reaction gases, offgas), a base structure 6 (especially base plate with electrodes) and the U-shaped polycrystalline silicon rod pairs 5. The reactor is surrounded by a protective shell 2.

For deinstallation of the polycrystalline silicon rod pairs 5, all the components connected to the upper reactor section 1 are first removed. These are especially the connections of the inlets and outlets 3 and 4 for media. Subsequently, the protective shell 2 is placed over the top of the entire reactor, i.e. over the upper reactor section 1 and base structure 6. Then the upper reactor section 1 is detached from the base structure 6, lifted off and transported away for cleaning.

The protective shell 2 ensures that personnel are protected from any polycrystalline silicon rod pairs 5 that fall over. In addition, the polycrystalline silicon rod pairs 5 can be deinstalled safely in spite of the absence of the upper reactor section 1. The deinstallation of the polycrystalline silicon rod pairs 5 itself can be effected by means of grabs, cranes or deinstallation cages as described in the prior art.

As a requirement of the production process, all the reactor surfaces should be cleaned before the reactor is recharged. However, cleaning of the inner reactor walls has to date not been possible until the polycrystalline silicon rod pairs 5 have been removed from the reactor.

Through the present invention, however, it is possible to commence cleaning in the upper reactor section 1 immediately after detachment from the base structure 6.

Figure 2:
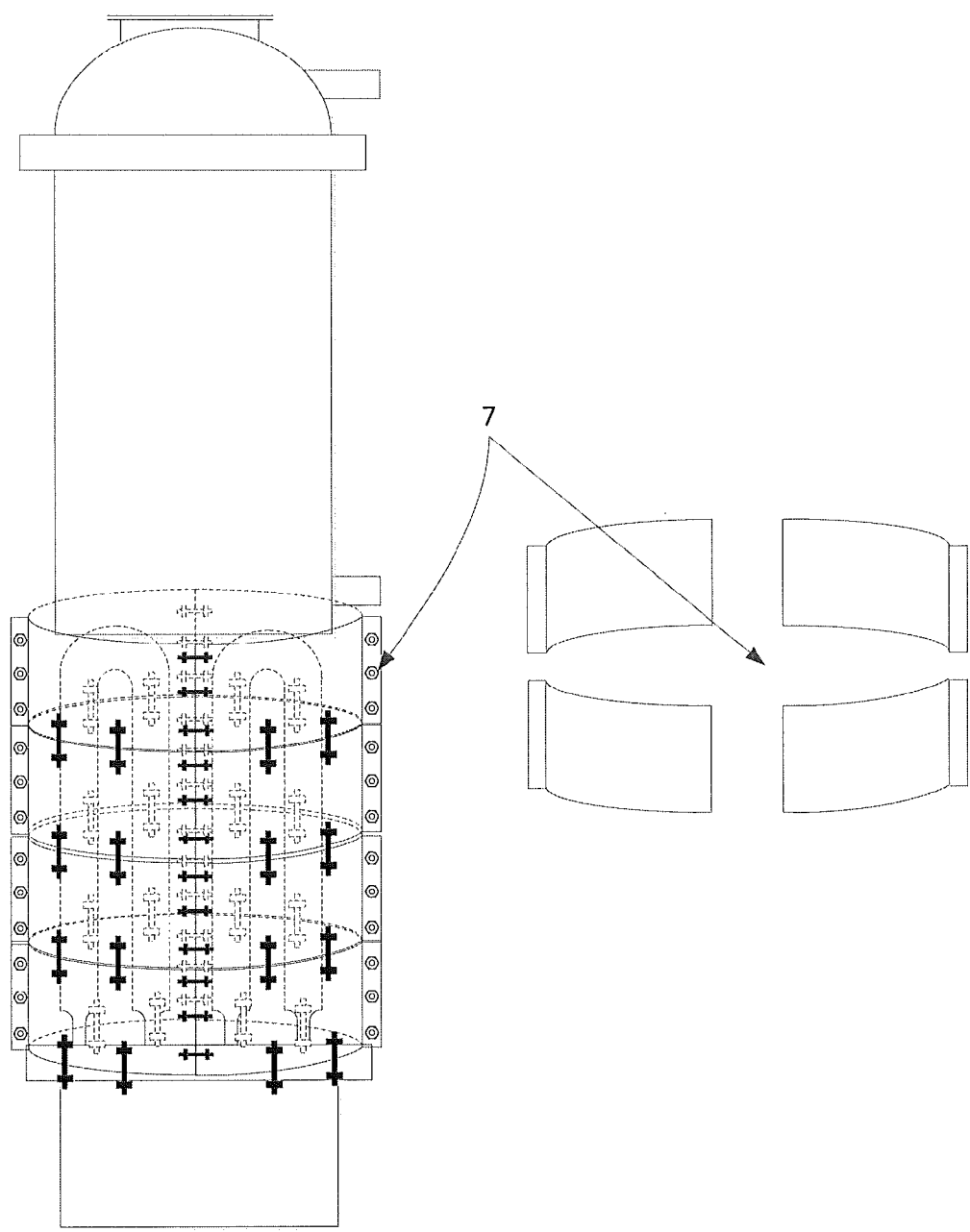
FIG. 2 shows a reactor with protective elements.

FIG. 2 shows a further embodiment of the process according to the invention.

This embodiment effectively provides for a growing deinstallation guard. Rather than a protective shell, as described in FIG. 1, which is placed over the entire reactor, protective elements 7 mounted on the upper reactor section are provided. These protective elements are pulled upward as well when the upper reactor section is lifted off after having been detached from the base structure. The protective elements 7 are configured such that, after the upper reactor section has been lifted off to a certain degree, they completely surround the polycrystalline silicon rod pairs 5. As soon as this is the case, the protective elements 7 are connected to the base structure and detached from the upper reactor section. In this embodiment too, the cleaning of the upper reactor section can be commenced immediately.

Preferably, the upper reactor section is first raised and the protective elements 7 are mounted. Subsequently, the protective elements 7 are connected to the base structure, and the connection of protective elements 7 and upper reactor section is released. Finally, the upper reactor section is transported away for cleaning.

Figure 3:
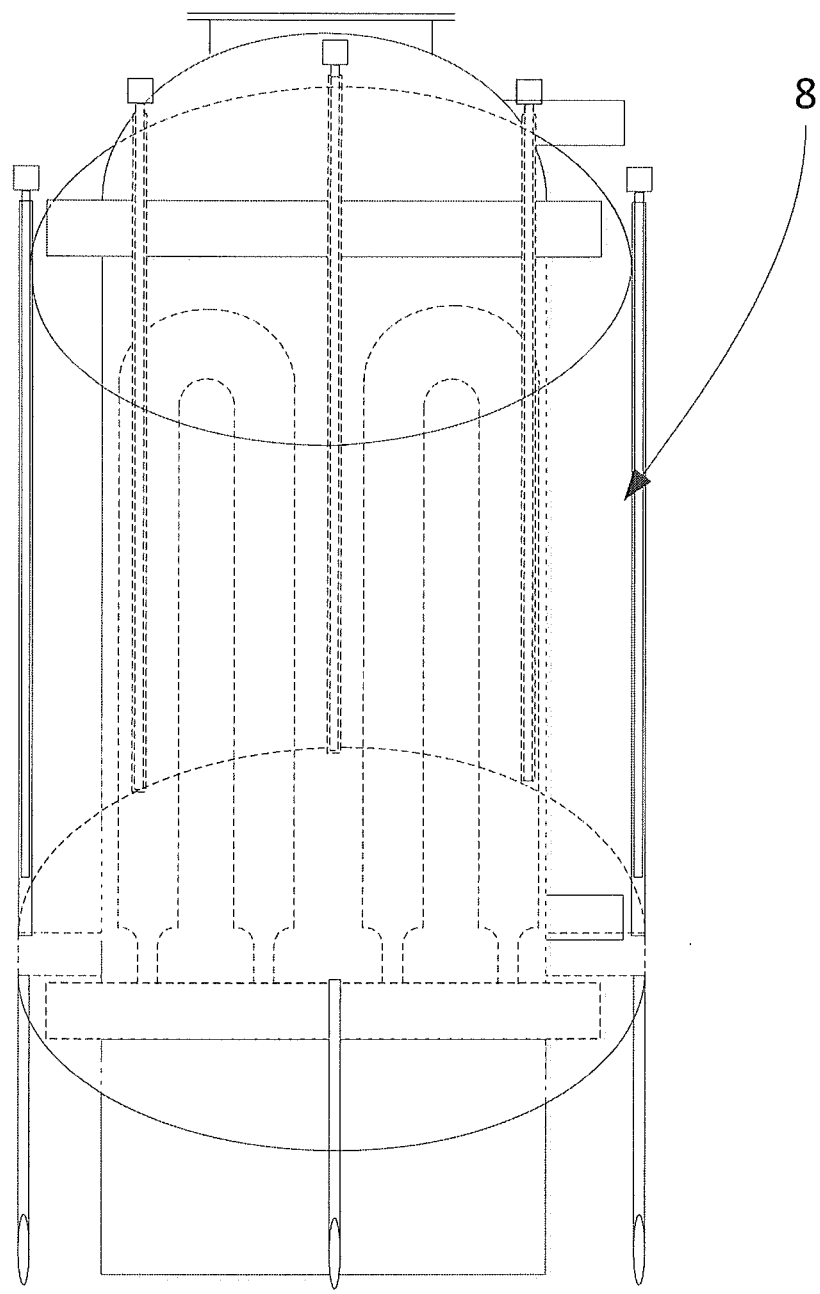
FIG. 3 shows a reactor and a movable protective wall.

FIG. 3 shows a further embodiment of the process according to the invention.

This comprises a kind of movable and foldable protective shell or protective wall 8. It is movable because it can be moved onto the side of the reactor. It is foldable because it comprises folding doors.

The protective wall 8 is moved onto the reactor from the side. The reactor is surrounded by means of folding doors, and the folding doors are closed, for example secured by means of bolts.

The invention claimed is:

1. A process for producing polycrystalline silicon, comprising introducing a reaction gas comprising a silicon-containing component and hydrogen into a reactor comprising a base plate, an upper reactor section secured to the base plate, heating at least one support body by passage of direct current, and depositing polycrystalline silicon onto the support body such that at least one polycrystalline silicon rod is obtained, wherein, after the deposition has ended, a protective shell is installed laterally around the reactor during the deinstallation of the at least one polycrystalline silicon rod, connections on the upper reactor section are removed, the protective shell is placed laterally around the deposition reactor, and then the upper reactor section is removed in order finally to deinstall the at least one polycrystalline silicon rod, and wherein, after the deposition has ended, the reactor is opened for a period of time before and/or while connections are being removed from the upper reactor section and before the protective shell is installed.

2. The process of claim 1, wherein, prior to the deinstallation of the at least one polycrystalline silicon rod, the polycrystalline silicon rod is covered with a bag-like plastic component.

3. The process of claim 1, wherein the at least one support body comprises two silicon rods connected to one another via a horizontal bridge, such that at least one polycrystalline silicon rod pair is deposited.

4. The process of claim 3, wherein deinstallation of the at least one polycrystalline silicon rod pair is accomplished using an apparatus having dimensions such that the apparatus can completely surround the polycrystalline silicon rod pair, and the apparatus together with the polycrystalline silicon rod pair that it surrounds interacts with a crane, a cable winch or a grab such that the apparatus along with the polycrystalline silicon rod pair is removed from the reactor.

5. The process of claim 1, wherein the at least one polycrystalline silicon rod is deinstalled and mechanically processed to obtain chunks of polycrystalline silicon.

6. A process for producing polycrystalline silicon, comprising introducing a reaction gas comprising a silicon-containing component and hydrogen into a reactor comprising a base plate, an upper reactor section secured to the base plate, heating at least one support body by passage of direct current and depositing polycrystalline silicon onto the support body such that at least one polycrystalline silicon rod is obtained, wherein, after the deposition has ended, a protective wall is placed laterally around the reactor during deinstallation of the at least one polycrystalline silicon rod, connections on the upper reactor section are removed and protective elements are installed laterally on the upper reactor section, these forming the protective wall, the upper reactor section together with the protective elements is then moved vertically upward until the at least one polycrystalline silicon rod is completely surrounded by the protective elements, the protective elements are then connected to the base plate and the protective elements are released from the upper reactor section and deinstalling the at least one polycrystalline silicon rod, and wherein after deposition has ended, the reactor is opened for a period of time before and/or while connections are being removed from the upper reactor section and before the protective wall is installed.

7. The process of claim 6, wherein, prior to the deinstallation of the at least one polycrystalline silicon rod, the polycrystalline silicon rod is covered with a bag-like plastic component.

8. The process of claim 6, wherein the at least one support body comprises two silicon rods connected to one another via a horizontal bridge, such that at least one polycrystalline silicon rod pair is deposited, and wherein deinstallation of the at least one polycrystalline silicon rod pair is accomplished using an apparatus having dimensions such that the apparatus can completely surround the polycrystalline silicon rod pair, and the apparatus together with the polycrystalline silicon rod pair that it surrounds interacts with a crane, a cable winch or a grab such that the apparatus along with the polycrystalline silicon rod pair is removed from the reactor.

9. The process of claim 6, wherein the at least one polycrystalline silicon rod is deinstalled and mechanically processed to obtain chunks of polycrystalline silicon.

10. A process for producing polycrystalline silicon, comprising introducing a reaction gas comprising a silicon-containing component and hydrogen into a reactor comprising a base plate, an upper reactor section secured to the base plate and heating at least one support body by passage of direct current on which polycrystalline silicon is deposited such that at least one polycrystalline silicon rod is obtained, wherein, after the deposition has ended, a protective wall containing folding doors is installed laterally around the reactor during deinstallation of the at least one polycrystalline silicon rod, connections on the upper reactor section are removed and the protective wall containing folding doors is moved onto the side of the reactor, the reactor being completely surrounded by the protective wall and the folding doors being closed before the removal of the upper reactor section and deinstallation of the at least one polycrystalline silicon rod, and wherein, after the deposition has ended, the reactor is opened for a period of time before and/or while connections are removed from the upper reactor section and before the protective wall is moved onto the reactor.

11. The process of claim 10, wherein, prior to the deinstallation of the at least one polycrystalline silicon rod, the polycrystalline silicon rod is covered with a bag-like plastic component.

12. The process of claim 10, wherein the at least one support body comprises two silicon rods connected to one another via a horizontal bridge, such that at least one polycrystalline silicon rod pair is deposited, and wherein deinstallation of the at least one polycrystalline silicon rod pair is accomplished using an apparatus having dimensions such that the apparatus can completely surround the polycrystalline silicon rod pair, and the apparatus together with the polycrystalline silicon rod pair that it surrounds interacts with a crane, a cable winch or a grab such that the apparatus along with the polycrystalline silicon rod pair is removed from the reactor.

13. The process of claim 10, wherein the at least one polycrystalline silicon rod is deinstalled and mechanically processed to obtain chunks of polycrystalline silicon.

* * * * *